United States Patent Office 3,600,140
Patented Aug. 17, 1971

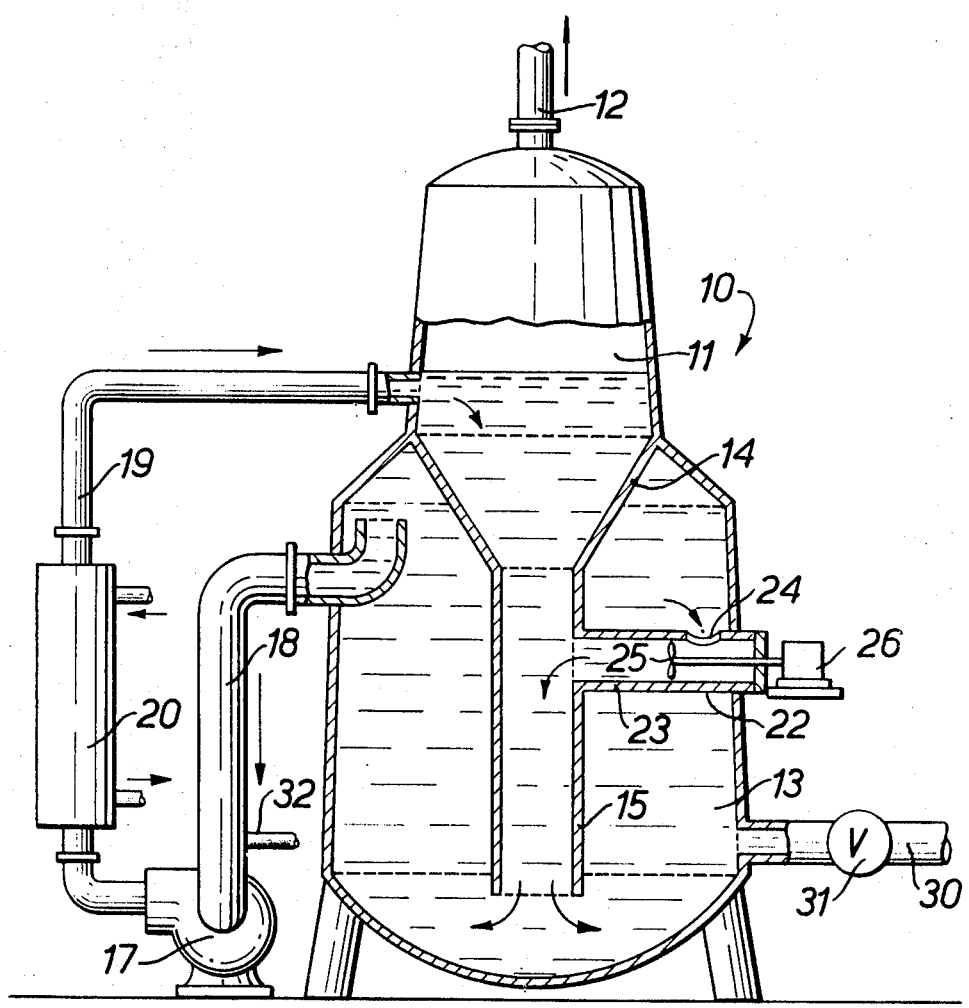

3,600,140
FLOW CRYSTALLIZER
Robert H. Hedrick, Warren, Pa., assignor to Struthers Scientific and International Corporation
Filed June 11, 1968, Ser. No. 736,224
Claims priority, application Great Britain, July 27, 1967, 34,607/67
Int. Cl. B01d 9/02
U.S. Cl. 23—273
1 Claim

ABSTRACT OF THE DISCLOSURE

In a crystallizer having a first recirculating loop between a vacuum evaporation chamber and a suspension chamber, there is added a second recirculation loop recirculating mother liquor in the lower portion of the suspension chamber to increase the upward velocity of fluid in the lower portion of the suspension chamber.

BACKGROUND OF THE INVENTION

In a conventional crystallizer, flow of mother liquor upward in the suspension chamber must be slow enough to prevent excessive circulation of even small crystals and yet it must be of sufficient velocity to support or suspend large crystals which are grown as supersaturation is relieved thereon. This tends to set limits on the maximum size of crystals which may be grown in a given crystallizer.

SUMMARY OF THE INVENTION

In a crystallizer with a lower suspension chamber, an integrally formed upper vacuum evaporation chamber mounted on the lower suspension chamber, a central passage conducting supersaturated liquid from the bottom of the evaporation chamber into the bottom of the suspension chamber, and a first recirculating loop drawing fluid from the upper portion of the suspension chamber and introducing it into the vacuum chamber to flow downward in the central passage, the improvement comprising a second recirculating loop drawing fluid from the suspension chamber below the inlet of the first recirculating loop, the second recirculating loop introducing fluid into the central passage increasing flow in its lower portion and in the lower portion of the suspension chamber.

BRIEF DESCRIPTION OF THE DRAWING

The figure of the drawing is a side view of a crystallizer according to this invention with its lower portion broken away in vertical section to show internal construction.

DESCRIPTION OF THE PREFERRED EMBODIMENT

A crystallizer, generally designated by the reference numeral 10, has an upper vacuum evaporation chamber 11 connected to a vacuum line 12. The lower suspension chamber 13 is integrally formed with the vacuum evaporation chamber 11. A cone 14 and a central passage 15 extend from chamber 11 to the bottom portion of chamber 13. An outlet 16 is disposed in the upper portion of suspension chamber 13 and is connected to pump 17 by pipe 18. Pump 17 returns mother liquor through pipe 19 to vacuum evaporation chamber 11. Thus, it may be seen that pump 17 circulates mother liquor which flows downward in channel 15 and upward in chamber 13. The mother liquor is cooled in chamber 11 so that its supersaturation is relieved by growing crystals suspended by the upward flow in chamber 13. For the crystallization of some salts, a steam jacket 20 or other heating device may be applied to pipe 19.

This invention provides a second recirculation system 22 for mother liquor in the lower portion of suspension chamber 13. Recirculation system 22 consists of a tube 23 leading laterally into channel 15. Tube 23 has an upward facing inlet port 24 and contains a fluid impeller 25 driven by motor 26. Impeller 25 draws mother liquor downward through port 24 and forces it inward to channel 15 where this flow joins that of the first recirculation system. Mother liquor being recirculated by both recirculation systems thus moves upward in the lower portion of suspension chamber 13 below inlet port 24. This results in a higher upward component of velocity of the mother liquor in the lower portion of the suspension chamber 13 so that larger sizes of crystals may be fluidized or supported therein. These large crystals may be withdrawn from the system as a slurry in mother liquor through pipe 30 controlled by valve 31. Feed solution is introduced into the system through pipe 32.

Since there is a lower upward velocity of mother liquor in the top part of suspension chamber 13, there is less likelihood that even small crystals will be recirculated into the vacuum evaporation chamber to provide unwanted nuclei. This permits a greater degree of supersaturation to be obtained in the vacuum evaporation chamber which is then relieved on larger crystals fluidized by the second recirculation system.

One problem associated with conventional crystallizers of the type described which do not have a second recirculation loop is the formation of deposits at an about the lower end of the central passage 15. These deposits are probably caused by pressure drop and turbulence at this point which would nucleate a supersaturated solution. Since the second recirculation loop of this invention recirculates smaller crystals with the mother liquor, this supersaturation is diluted at the lower end of passage 15 and provides some crystals within the lower end of passage 15 on which any high degree of supersaturation may be deposited. This helps in reducing unwanted deposits on the apparatus.

While this invention has been shown and described in the best form known, it will nevertheless be understood that this is purely exemplary and that modifications may be made without departing from the spirit and scope of the invention.

What is claimed is:

1. In a crystallizer having a lower suspension chamber, an upper vacuum evaporation chamber mounted over said lower suspension chamber, a vertical central channel or duct conducting supersaturated liquid from the bottom of the evaporation chamber downward through the suspension chamber to its lower portion, and a first recirculating loop having a heater therein and having an inlet drawing fluid from the upper part of said suspension chamber and introducing it into said vacuum chamber to flow downward in said central channel, the improvement comprising, in combination, a second recirculating loop having an inlet drawing fluid from said suspension chamber below the inlet to said first recirculating loop, said second recirculating loop introducing fluid into said central channel increasing the rate of flow downward in its lower portion and increasing the rate of flow upward in the lower portion of said suspension chamber below the inlet of said second recirculating loop, wherein said upper vacuum evaporation chamber and said lower suspension chambers are integrally formed and wherein said second recirculating loop comprises at least one horizontally disposed lateral tube communicating with said central channel below the inlet to said first recirculating loop, said at least one lateral tube having an upward facing opening forming an inlet thereto, and motor driven impeller means within the lateral tube driving fluid inward in said tube to said central channel.

References Cited

UNITED STATES PATENTS

| | | | |
|---|---|---|---|
| 1,331,373 | 2/1920 | Prache | 23—273 |
| 2,025,059 | 12/1935 | Kermer | 23—273 |
| 2,567,968 | 9/1951 | Saeman | 23—273 |
| 3,503,803 | 3/1970 | Bennett et al. | 23—273 |

NORMAN YUDKOFF, Primary Examiner

R. T. FOSTER, Assistant Examiner

U.S. Cl. X.R.

159—45